United States Patent [19]
Walton et al.

[11] Patent Number: 5,097,194
[45] Date of Patent: Mar. 17, 1992

[54] MOTOR WITH PLURAL GENERATORS SET

[76] Inventors: Randal Walton, 457 S 4 #30, Rexburg, Id. 83440; George Spector, 233 Broadway Rm 3815, New York, N.Y. 10007

[21] Appl. No.: 582,662
[22] Filed: Sep. 12, 1990
[51] Int. Cl.⁵ .................................. H02J 7/14
[52] U.S. Cl. ................................. 320/61; 322/8
[58] Field of Search ............... 320/61; 322/1, 7, 8; 307/84

[56] References Cited

U.S. PATENT DOCUMENTS

| | | | |
|---|---|---|---|
| 778,133 | 12/1904 | Keates | 318/139 |
| 3,187,250 | 6/1965 | Born et al. | 322/32 |
| 3,845,835 | 11/1974 | Petit | 180/65.3 |
| 4,019,119 | 4/1977 | Naber | 322/8 |
| 4,289,954 | 9/1981 | Brognano et al. | 392/451 |
| 4,413,698 | 11/1983 | Conrad et al. | 180/305 |
| 4,439,720 | 3/1984 | Georges | 322/4 |
| 4,525,661 | 6/1985 | Mucsy et al. | 322/4 |

Primary Examiner—Steven L. Stephan
Assistant Examiner—Ben Davidson

[57] ABSTRACT

An electric generating system is provided and consists of a generator mechanically operated by a starter motor in which the generator operates a battery charger to recharge a battery that can operate the starter motor when the starter motor is disengaged from a remote power source.

2 Claims, 5 Drawing Sheets

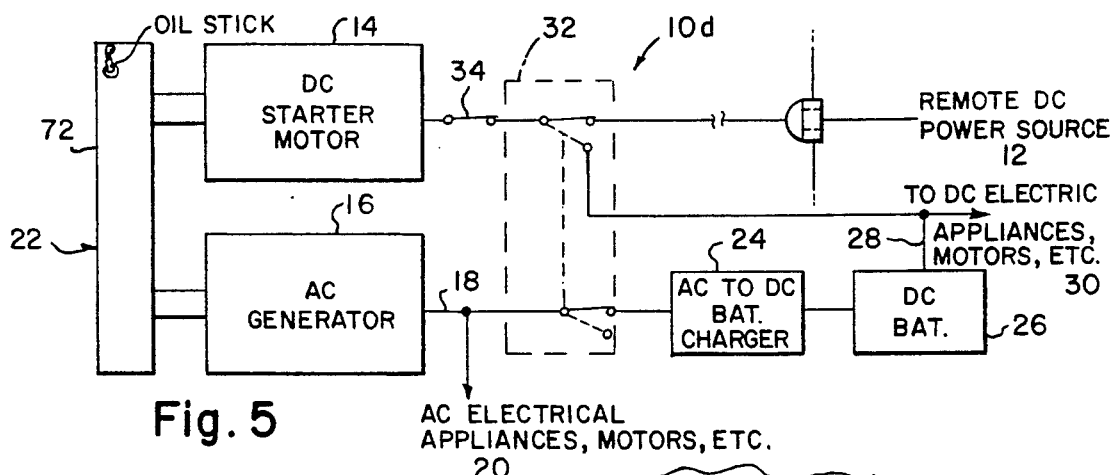
Fig. 5
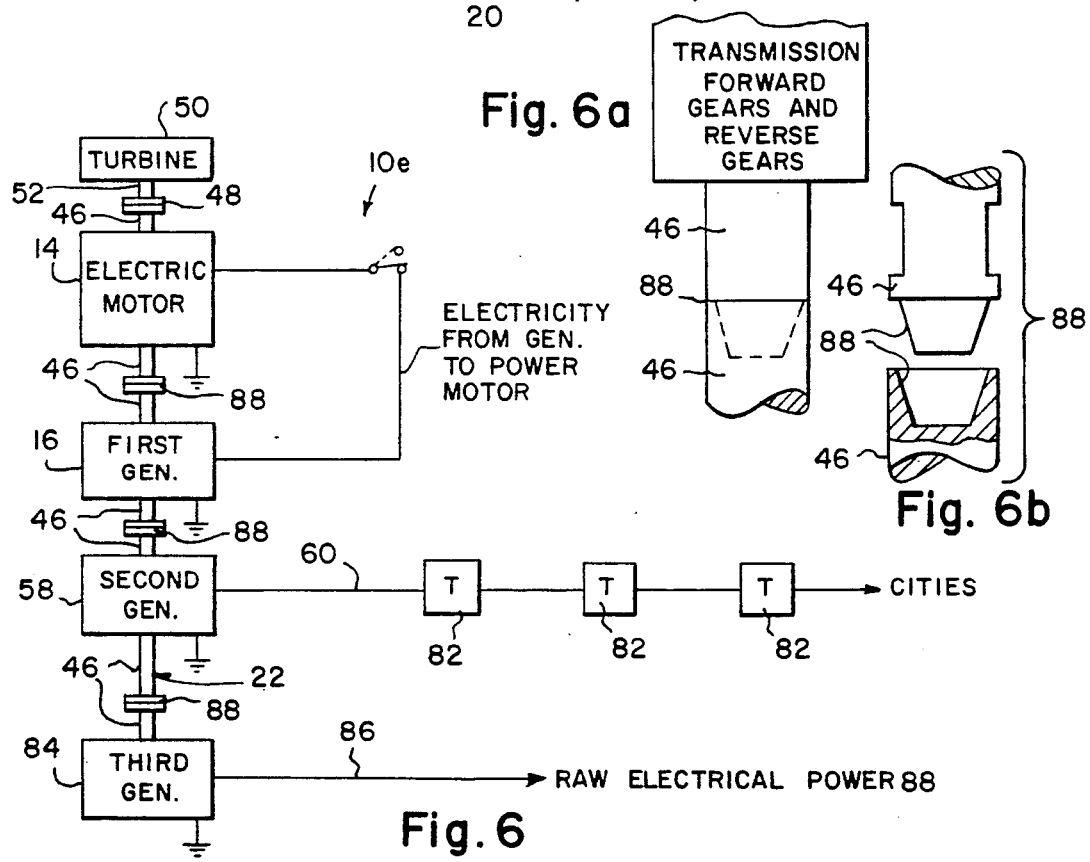
Fig. 6a
Fig. 6b
Fig. 6
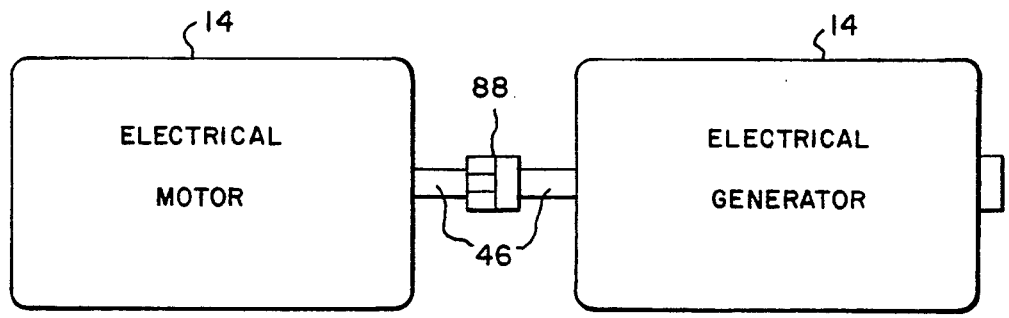
Fig. 7

MOTOR WITH PLURAL GENERATORS SET

BACKGROUND OF THE INVENTION

The instant invention relates generally to power supply equipment and more specifically it relates to an electric generating system which provides a motor driving at least one generator to produce electrical power.

There are available various conventional power supply equipment which do not provide the novel improvements of the invention herein disclosed.

SUMMARY OF THE INVENTION

A primary object of the present invention is to provide an electric generating system that will overcome the shortcomings of the prior art devices.

Another object is to provide an electric generating system in which a motor is mechanically connected to at least one generator so that the generator can produce electricity to change a battery which sometimes runs the motor.

An additional object is to provide an electric generating system in which a remote power source can be hooked into the system to sometimes run the motor.

A further object is to provide an electric generating system that is simple and easy to use.

A still further object is to provide an electric generating system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 5 is a block diagram of a fifth embodiment of the invention.

FIG. 6 is a block diagram of a sixth embodiment of the invention.

FIG. 6a is a block diagram showing a first type of shaft connection for FIG. 6.

FIG. 6b is a block diagram showing a second type of shaft connection for FIG. 6.

FIG. 7 is a block diagram showing a third type of shaft connection between the motor and generator.

DETAILED DESCRIPTION OF THE PREFERRED EMBODIMENTS

Figure 1:
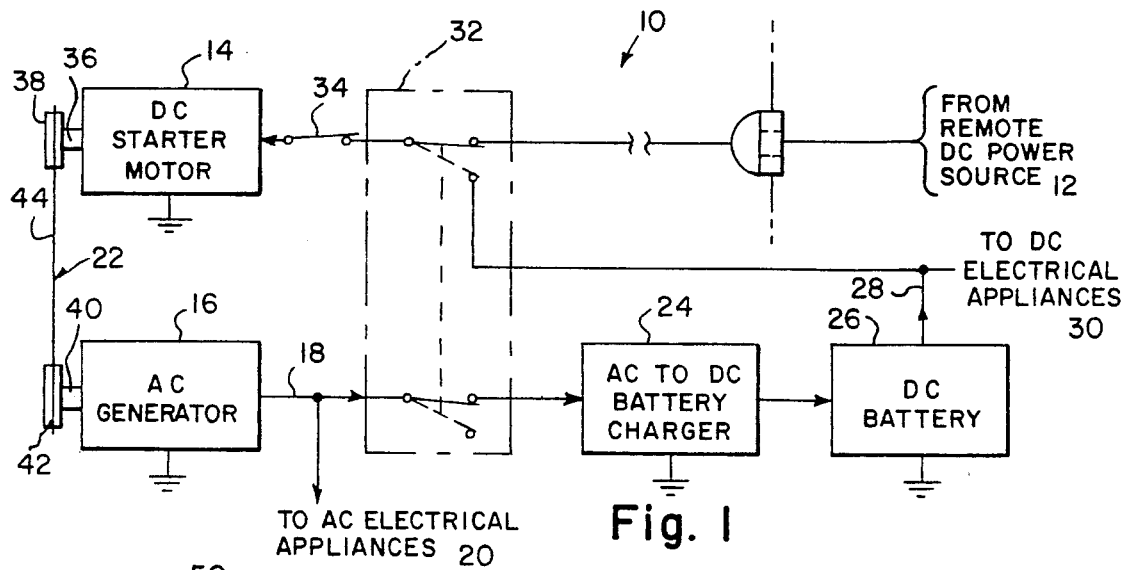
FIG. 1 is a block diagram of a first embodiment of the invention.

Turning now descriptively to the drawings, in which similar reference characters denote similar elements throughout the several views, FIG. 1 illustrates an electric generating system 10 consisting of a remote power source 12, a starter motor 14, a generator 16 having an output line 18 supplying a first type of current to electrical appliances 20, a drive 22 between the motor 14 and the generator 16 for mechanically operating the generator 16, a battery charger 24, a battery 26 having an output line 28 supplying a second type of current to electrical appliances 30, whereby the battery 26 is electrically connected to the battery charger 24.

A switch system 32 is electrically connected to the remote power source 12, the starter motor 14, the generator 16, the battery charger 24 and the output line 28 of the battery 26. When the switch system 32 is placed in a first position the starter motor 14 is electrically connected to the remote power source 12, while the output line 18 of the generator 16 is electrically connected to the battery charger 24. When the switch system 32 is placed in a second position the starter motor 14 is electrically connected to the output line 28 of the battery 26, while the output line 18 of the generator 16 is electrically disconnected from the battery charger 24. An on-off switch 34 is electrically connected between the starter motor 14 and the switch system 32 so as to turn the starter motor 14 on and off.

The mechanical drive 22 consists of a drive shaft 36 extending from the motor 14 with a first pulley 38 mounted on the drive shaft 36. A driven shaft 40 extends from the generator 16 with a second pulley 42 mounted on the driven shaft 40. A continuous belt 44 is connected between the first pulley 38 and the second pulley 42 so that the drive shaft 36 will operate the driven shaft 40.

Figure 2:
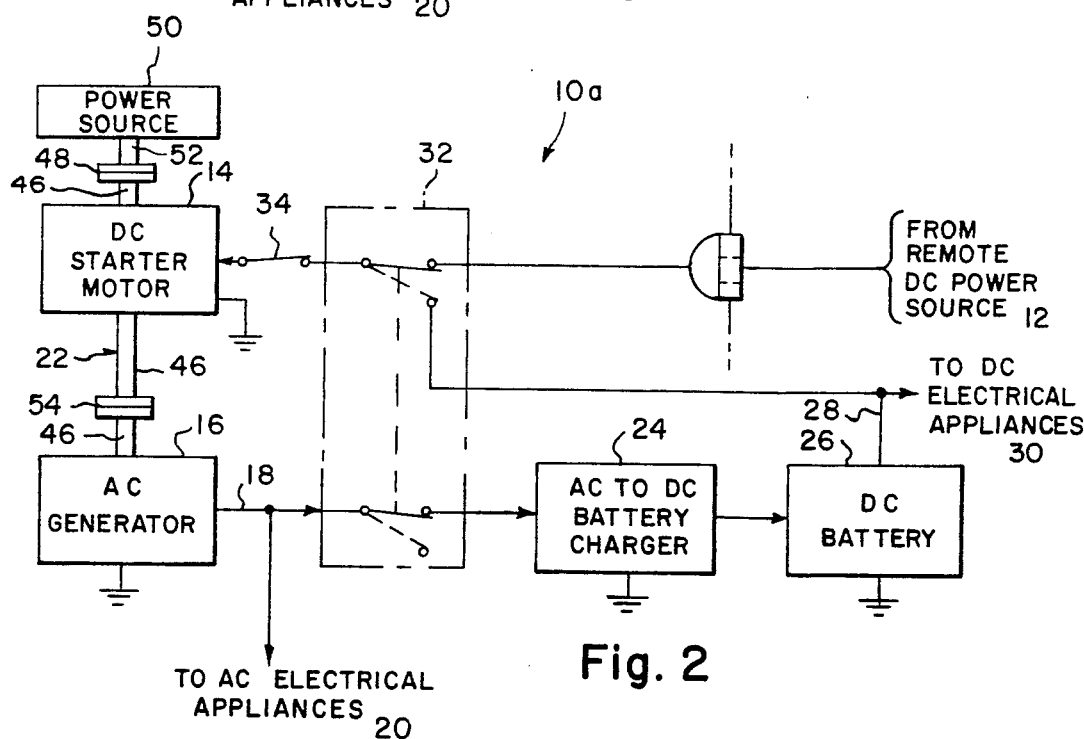
FIG. 2 is a block diagram of a second embodiment of the invention.

FIG. 2 shows a second embodiment 10a with another type of mechanical drive 22 which consists of a common shaft 46 directly from the starter motor 14 to the generator 16. A clutch 48 is mounted on the common shaft 46 extending from the opposite side of the starter motor 14. A second power source 50 has a shaft 52 connected to the clutch 48 so that when the starter motor 14 is turned off by the on-off switch 34 the clutch 48 can be engaged allowing the second power source 50 to drive the common shaft 46. A second clutch 54 is mounted on the common shaft 46 between the starter motor 14 and the generator 16 so that the second clutch 54 can be disengaged to shut down the generator 16.

Figure 3:
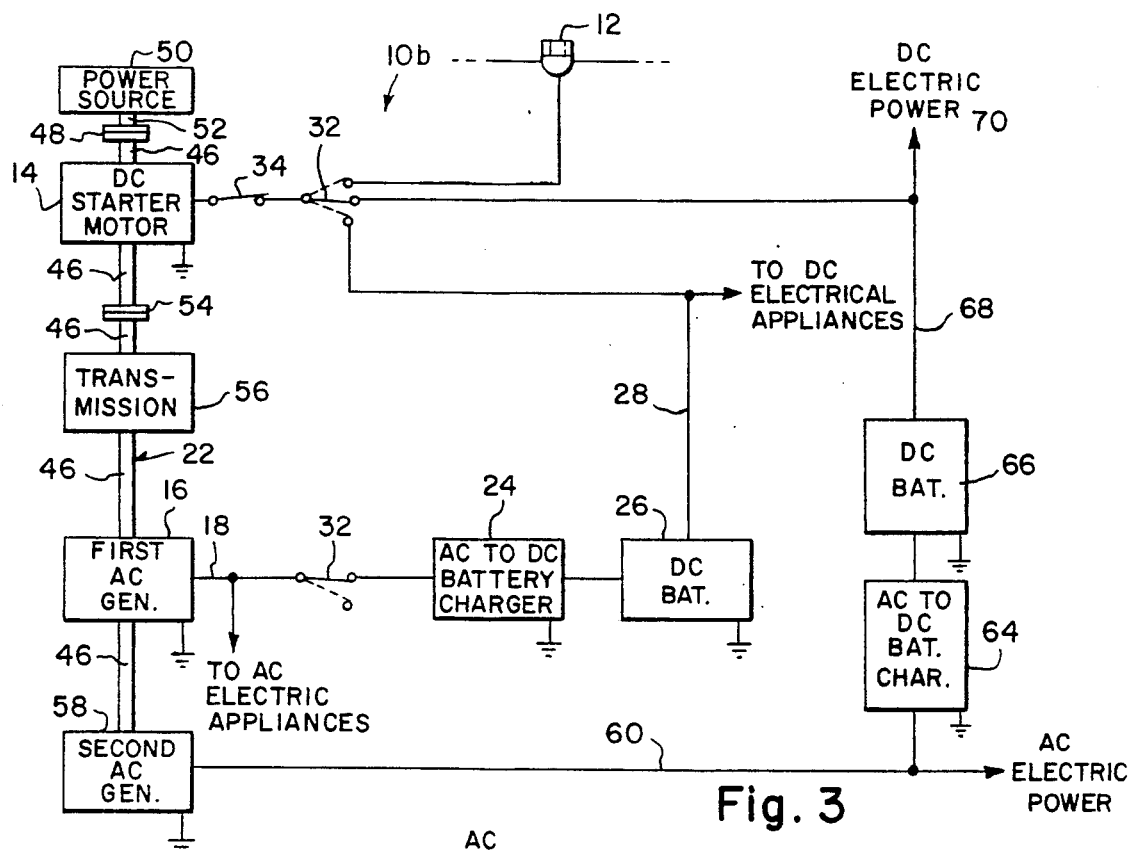
FIG. 3 is a block diagram of a third embodiment of the invention.

FIG. 3 shows a third embodiment 10b with a transmission 56 mounted on the common shaft 46 between the second clutch 54 and the generator 16 for maintaining higher speeds to generate more power to the electrical appliances 20 and 30. A second generator 58 is coupled to the common shaft 46. The second generator 58 has an output line 60 supplying a first type of electric power 62. A second battery charger 64 is electrically connected to the output line 60 of the second generator 58. A second battery 66 has an output line 68 supplying a second type of electric power 70 and is connected to the switch system 32 so that the starter motor 14 can be alternately operated from the remote power source 30, the first battery 26 and the second battery 66 through the switch system 32.

Figure 4:
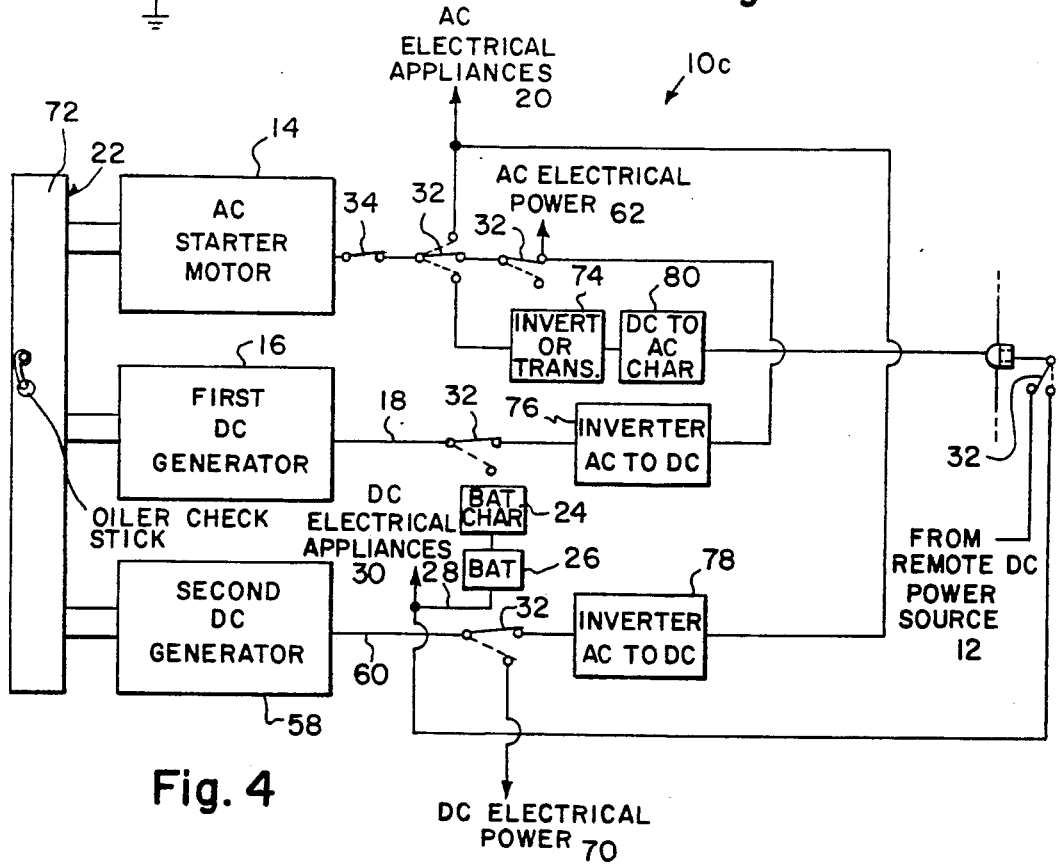
FIG. 4 is a block diagram of a fourth embodiment of the invention.

FIGS. 4 and 5 show a third embodiment 10c and a fourth embodiment 10d, wherein the mechanical drive 22 consists of a gear and chain oiler box 72 between the starter motor 14 and the generator 16. In FIG. 4, a second generator 58 is coupled to the gear and chain oiler box 72. The second generator 58 has an output line 60 electrically connected to the switch system 32. A first invertible 74, a second inverter 76 and a third inverter 78 are electrically connected to the switch system 32. A charger 80 is electrically connected to the first inverter 74 so that the starter motor 14 can be alternately operated from the remote power source 12 through the first inverter 74, the first generator 16 through the second inverter 76 and the second generator 58 through the third inverter 78.

FIG. 6 shows a fifth embodiment 10e which includes a second generator 58 coupled to the common shaft 46, whereby the second generator 58 has an output line 60 connected to a plurality of transformers 82 in series to supply increased power to cities. A third generator 84 is coupled to the common shaft 46, whereby the third generator 84 has an output line 86 for supplying raw electric power 87. Three shaft connectors 88 are provided and are best seen in FIGS. 6a, 6b and 7. The first shaft connector 88 is mounted on the common shaft 46 between the starter motor 14 and the first generator 16. The second shaft connector 88 is mounted on the common shaft 46 between the first generator 16 and the second generator 58. The third shaft connector 88 is mounted on the common shaft 46 between the second generator 58 and the third generator 84.

Figure 8:
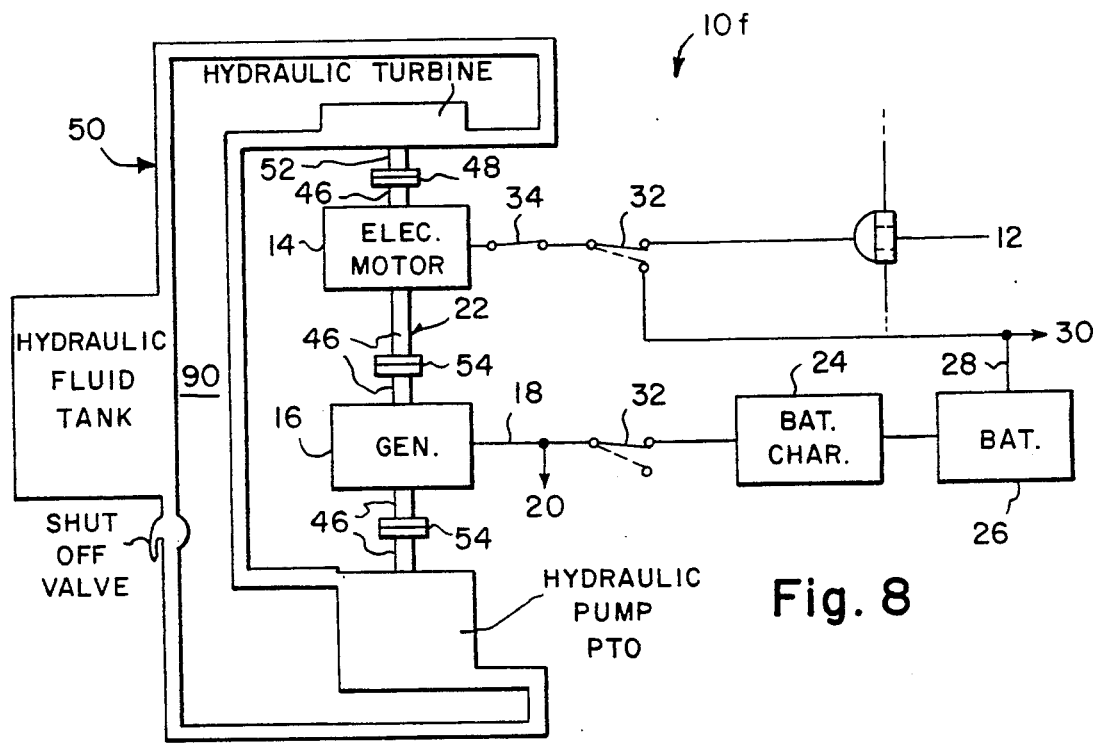
FIG. 8 is a block diagram of a seventh embodiment of the invention.

FIG. 8 shows a seventh embodiment 10f wherein the second power source 50 is a hydraulic drive system 90.

Figure 9:
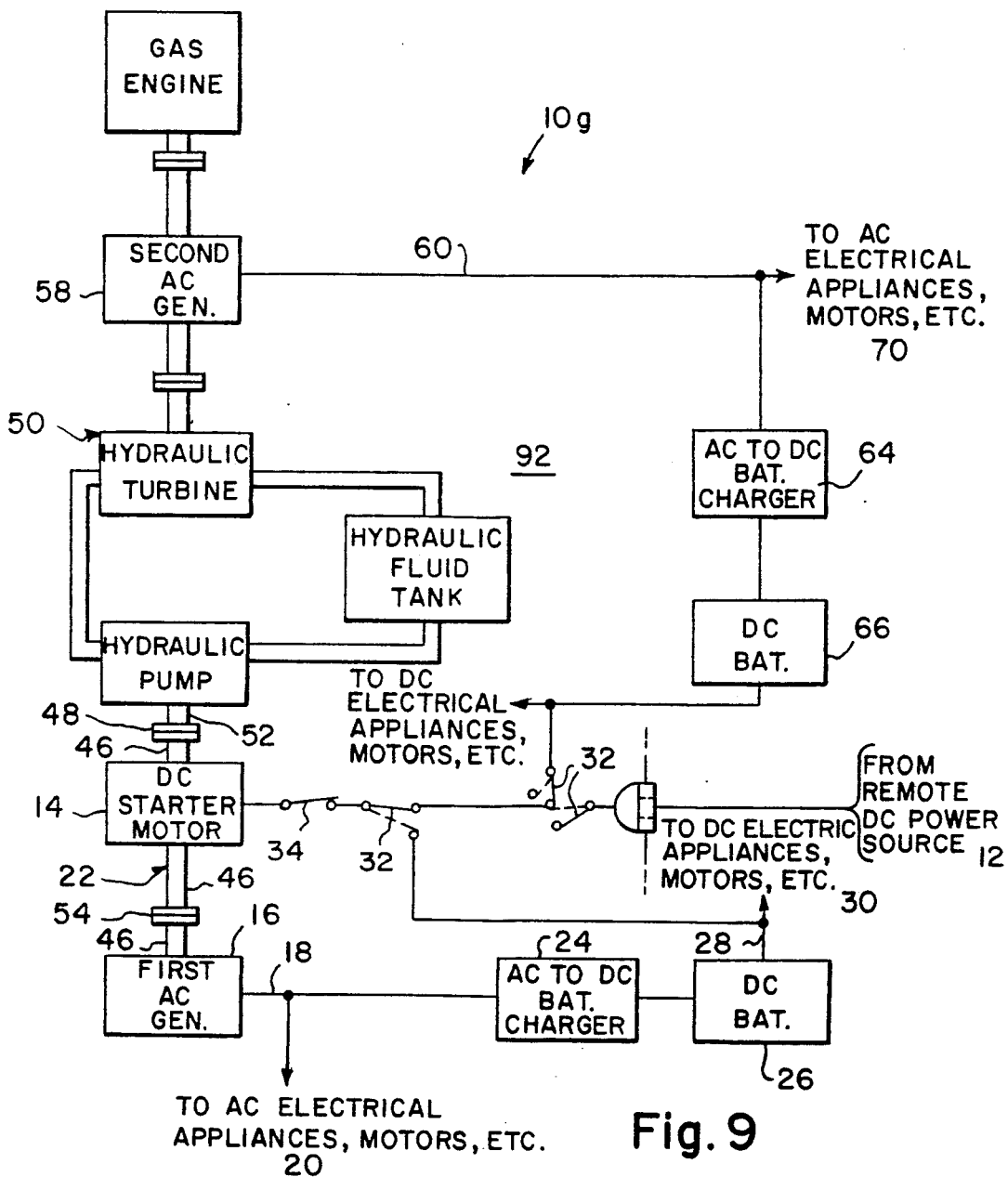
FIG. 9 is a block diagram of an eighth embodiment of the invention.

FIG. 9 shows an eighth embodiment 10g wherein the second power source 50 is a combination hydraulic electric generator and gas engine drive system 92.

Figure 10:
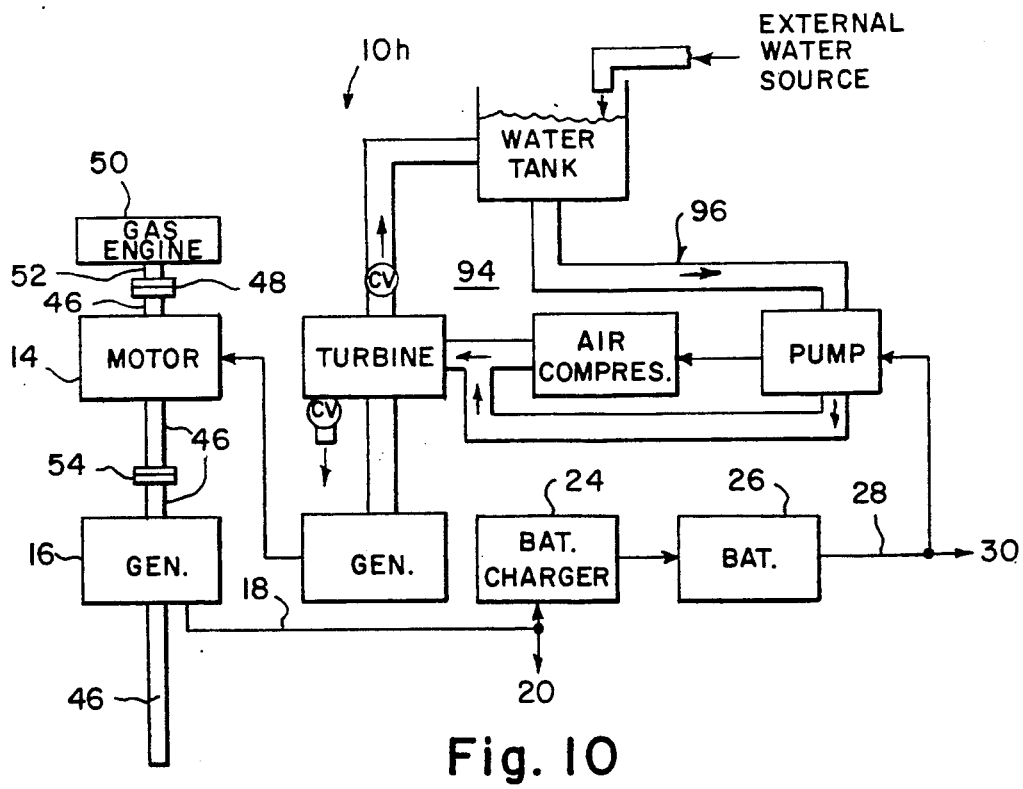
FIG. 10 is a block diagram of a ninth embodiment of the invention.

FIG. 10 shows a ninth embodiment 10h consisting of a gas engine 50 with a starter motor 14 disengageably coupled to the gas engine 50. A first generator 16 is coupled to the starter motor 14. The first generator 16 has an output line 18 supplying a first type of current to electrical appliances 20. A battery charger 24 is electrically connected to the output line 18 of the generator 16. A battery 26 has an output line 28 supplying a second type of current to electrical appliances 30 whereby the battery 26 is electrically connected to the battery charger 24. A power source 94 is hydraulically driven at 96 and is electrically connected between the output line 28 of the battery 26 and the starter motor 14 to operate the starter motor 14 after the gas engine 50 is disengaged from the starter motor 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:
1. An electric generating system comprising:
   a) a remote power source;
   b) a starter motor;
   c) a generator having an output line supplying a first type of current to electrical appliances;
   d) means between said motor and said generator for mechanically operating said generator;
   e) a battery charger;
   f) a battery having an output line supplying a second type of current to electrical appliances, said battery electrically connected to said battery charger;
   g) a switch system electrically connected to said remote power source, said starter motor, said generator, said battery charger and the output line of said battery so that when said switch system is placed in a first position said starter motor is electrically connected to said remote power source, while the output line of said generator is electrically connected to said battery charger and when said switch system is placed in a second position said starter motor is electrically connected to the output line of said battery, while the output line of said generator is electrically disconnected from said battery charger;
   h) an on-off switch electrically connected between said starter motor and said switch system so as to turn said starter motor on and off; wherein said mechanical means comprises a common shaft directly from said starter motor to said generator, wherein said mechanical means further comprises:
   i) a clutch mounted on said common shaft extending from an opposite side of said starter motor;
   j) a second power source having a shaft connected to said clutch so that when said starter motor is turned off by said on-off switch, said clutch can be engaged allowing said second power source to drive said second common shaft;
   k) a second generator coupled to said common shaft, said second generator having an output line;
   l) a plurality of transformers connected in series to the output line of said second generator so as to supply increased power to cities; and
   m) a third generator coupled to said common shaft, said third generator having an output line for supplying raw electric power.
2. An electric generating system as recited in claim 1, further comprising three shaft connectors, said first shaft connector mounted on said common shaft between said starter motor and said first generator, said second shaft connector mounted on said common shaft between said first generator and said second generator and said third shaft connector mounted on said common shaft between said second generator and said third generator.

* * * * *